(No Model.)  11 Sheets—Sheet 1.
J. WALKER.
MOLDING MACHINE.
No. 287,983.  Patented Nov. 6, 1883.
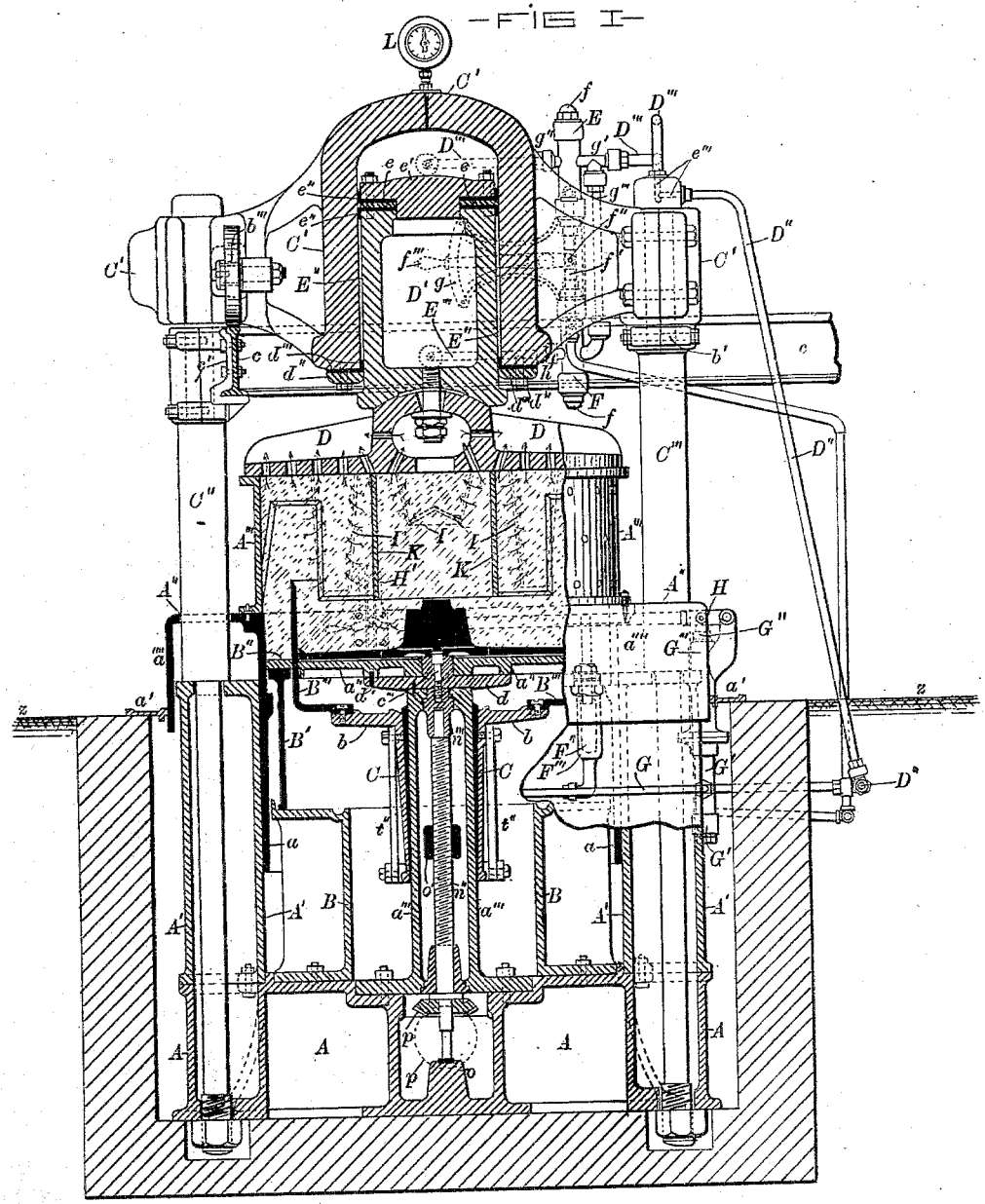
FIG. I.
WITNESSES  
Dan'l Fisher  
Charles H. Wight
INVENTOR  
John Walker  
by Geo. W. Howard  
Attorneys

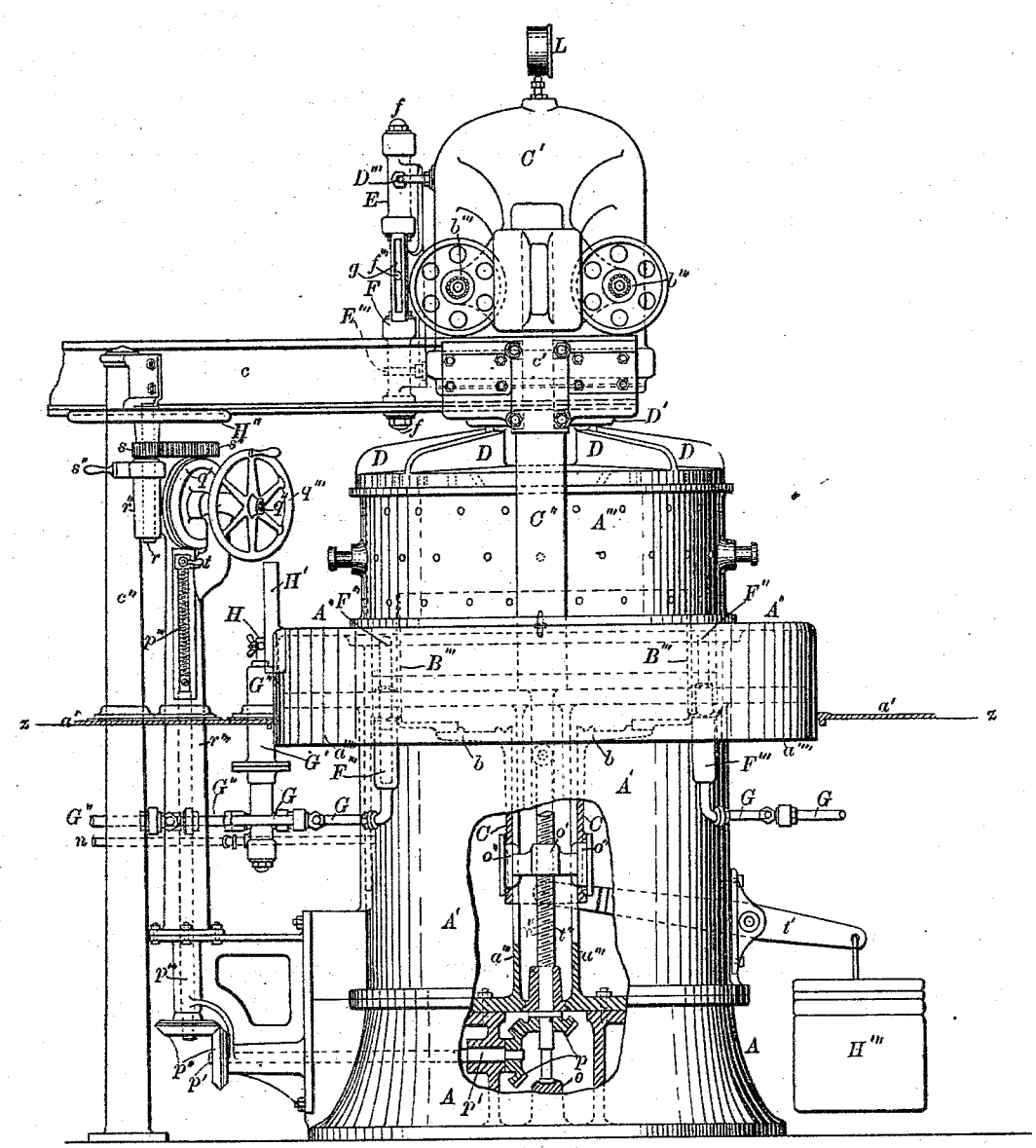

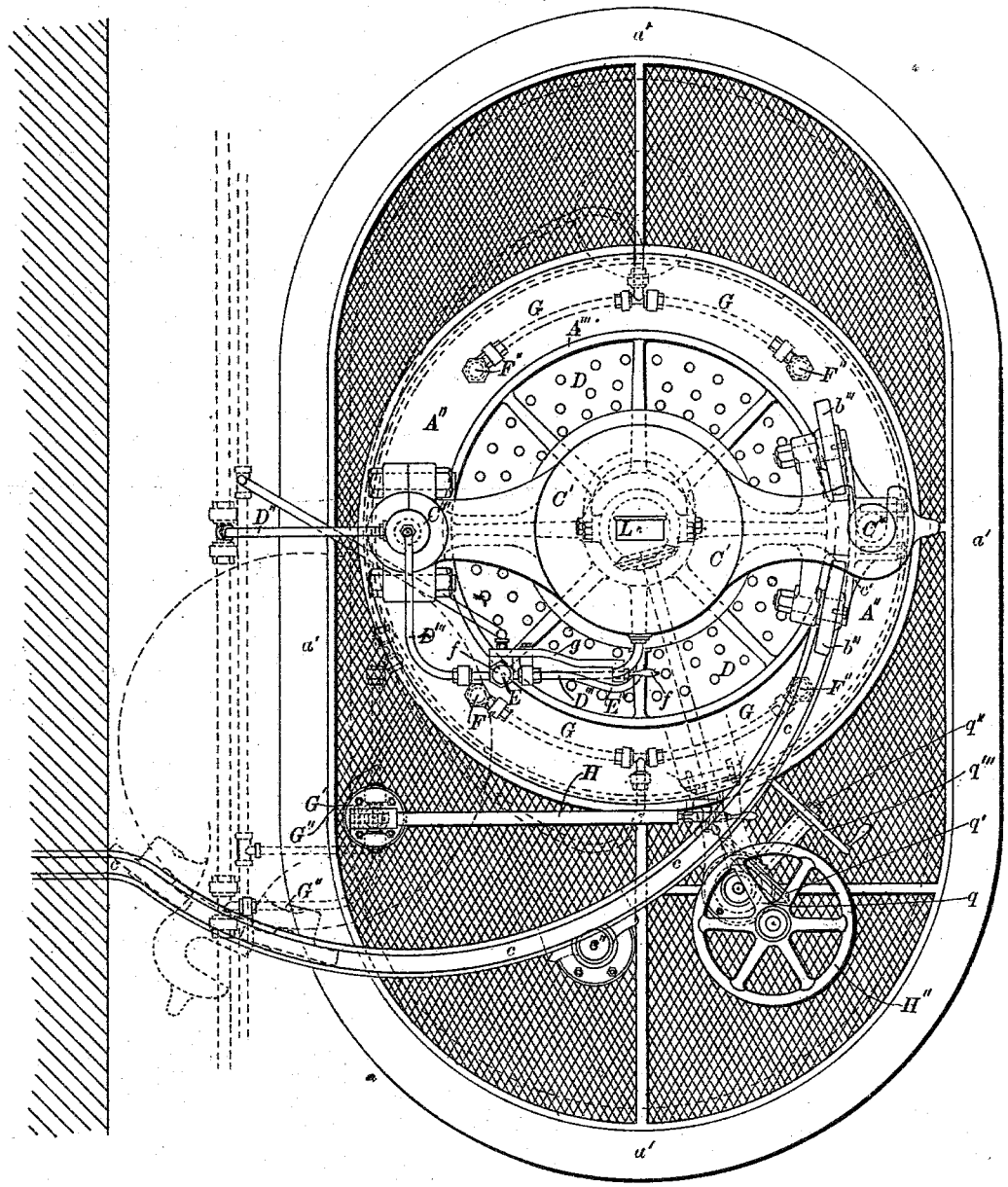

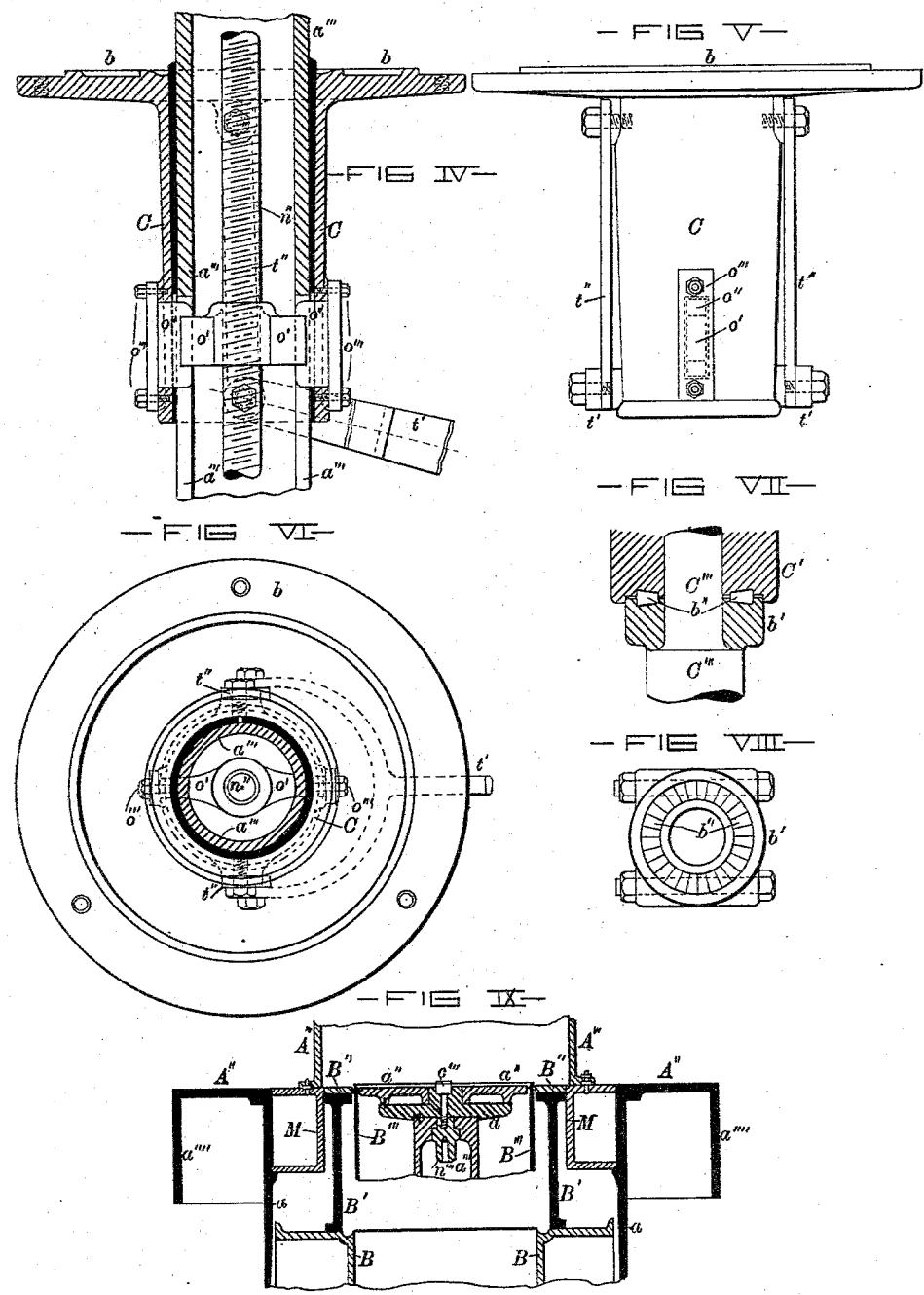

(No Model.)  11 Sheets—Sheet 5.
J. WALKER.
MOLDING MACHINE.
No. 287,983.  Patented Nov. 6, 1883.
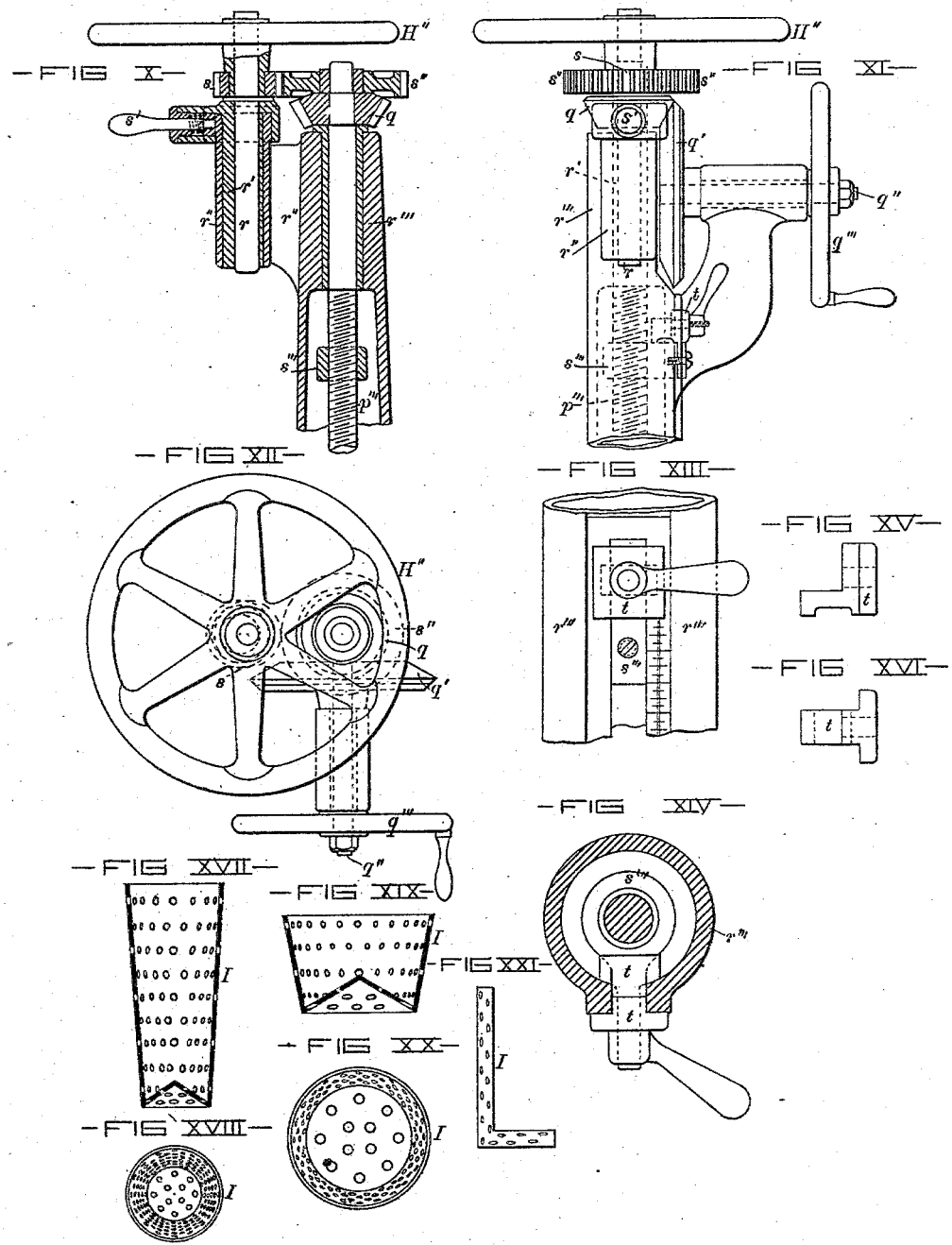

(No Model.) 11 Sheets—Sheet 6.
J. WALKER.
MOLDING MACHINE.
No. 287,983. Patented Nov. 6, 1883.
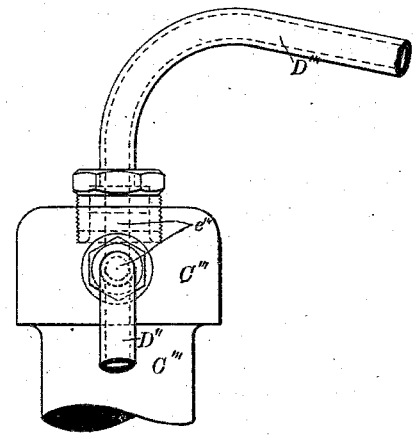
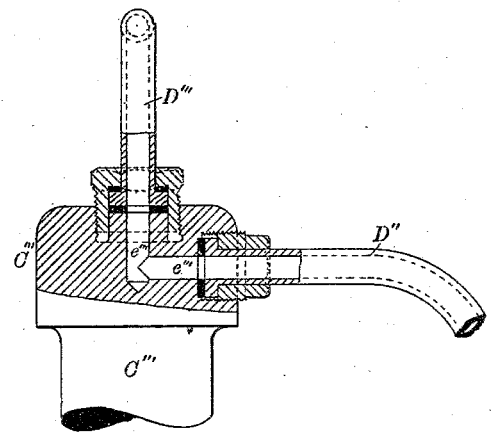
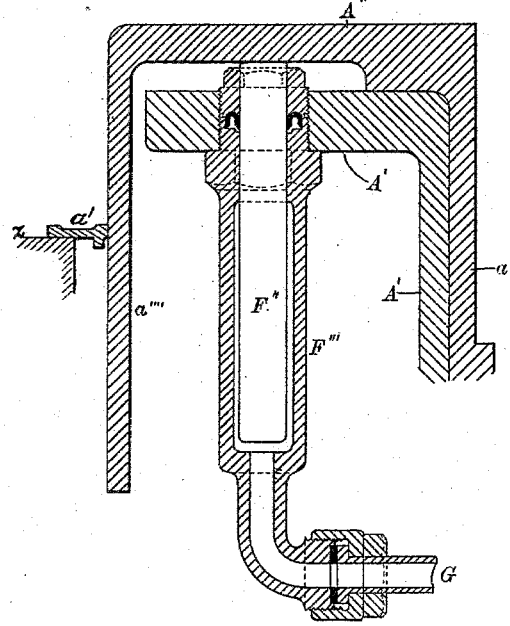
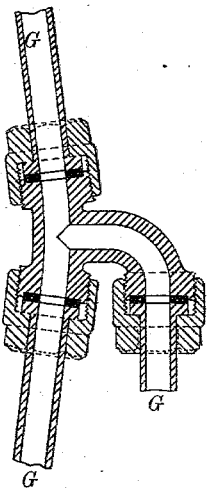
WITNESSES
Dan'l Fischer
Charles H. Wight
INVENTOR
John Walker,
by Geo. W. Howard,
Attorneys.

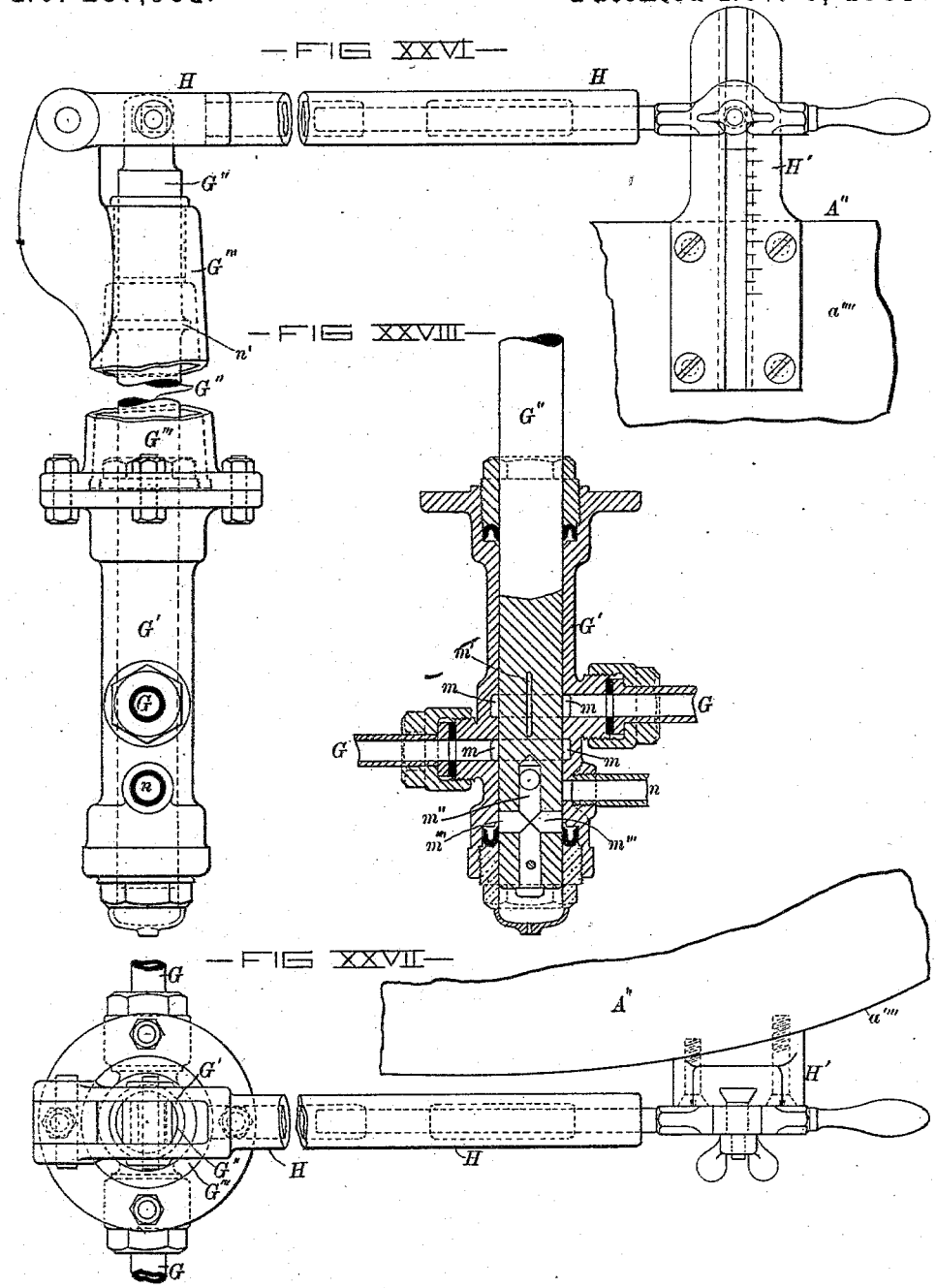

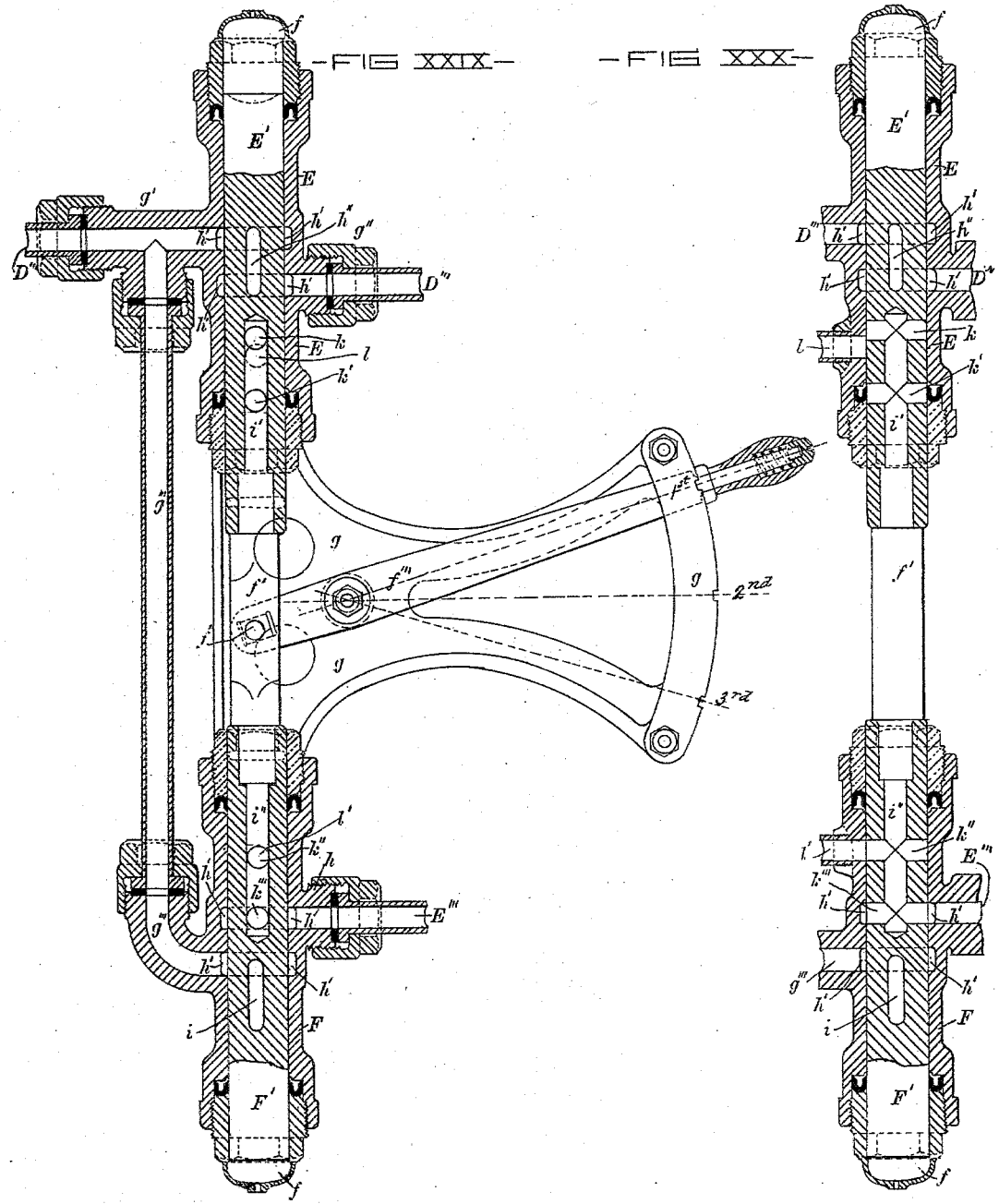

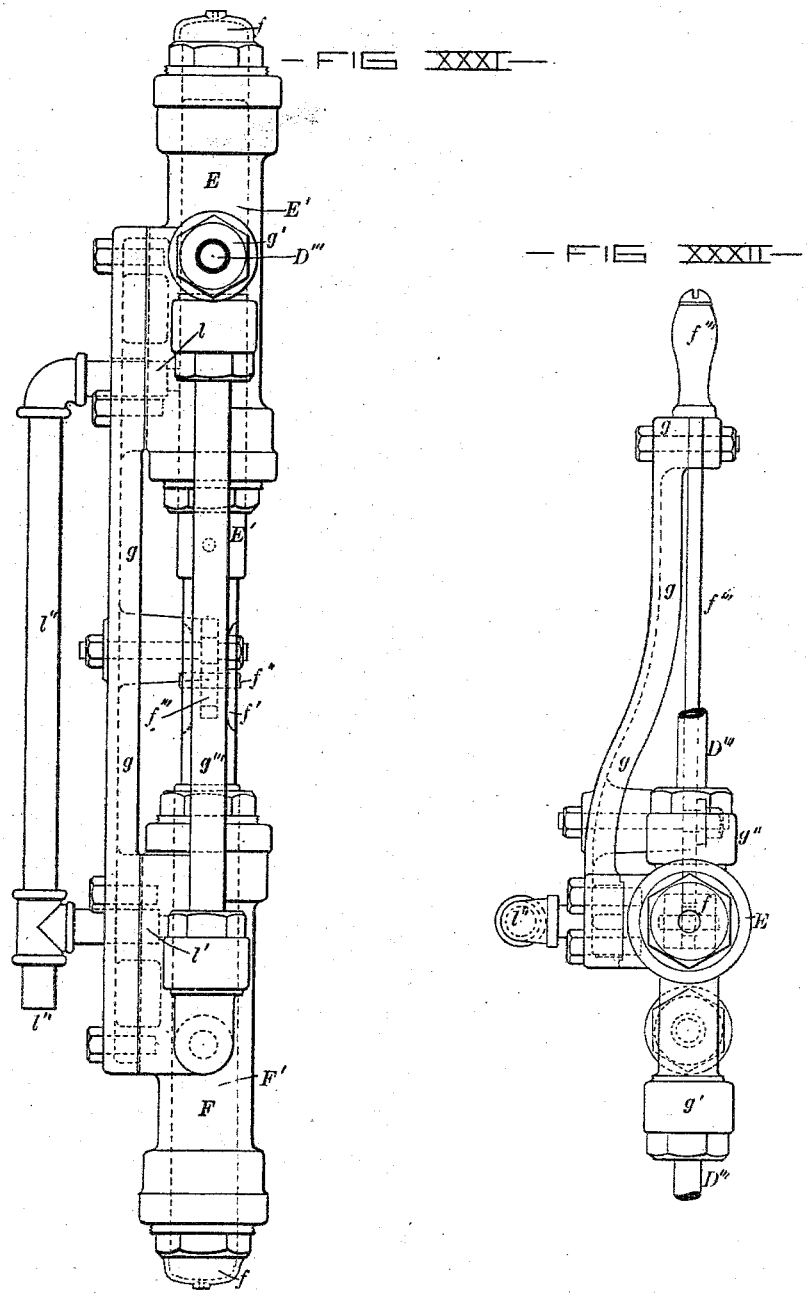

(No Model.)  11 Sheets—Sheet 10.
J. WALKER.
MOLDING MACHINE.
No. 287,983. Patented Nov. 6, 1883.
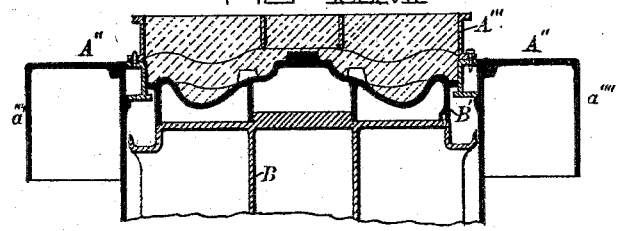
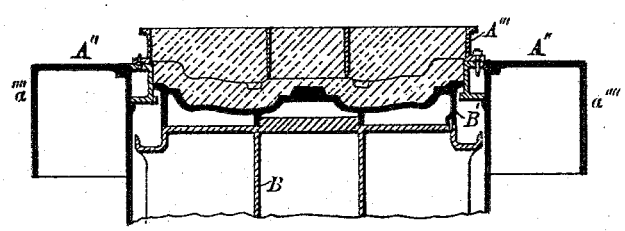
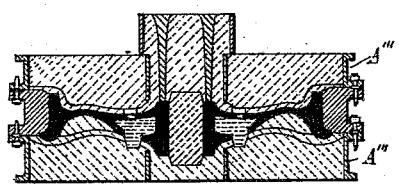
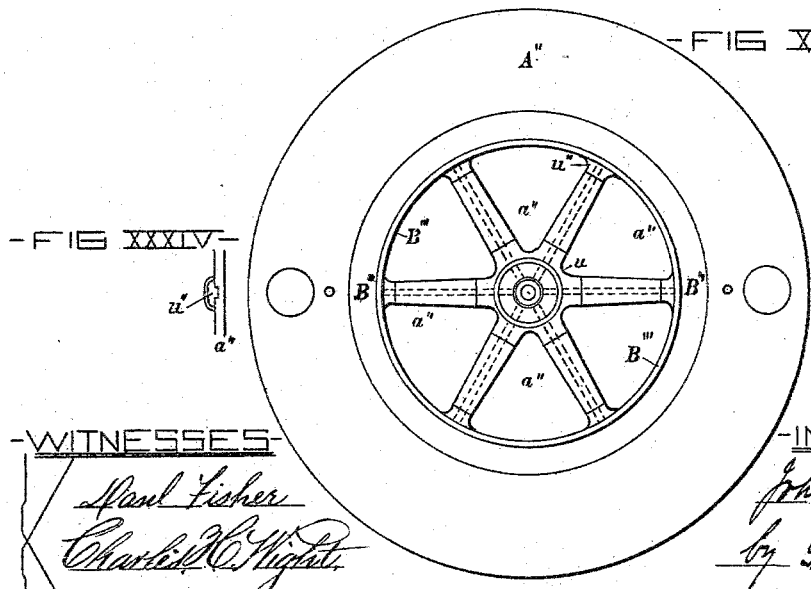
WITNESSES  
INVENTOR  
John Walker

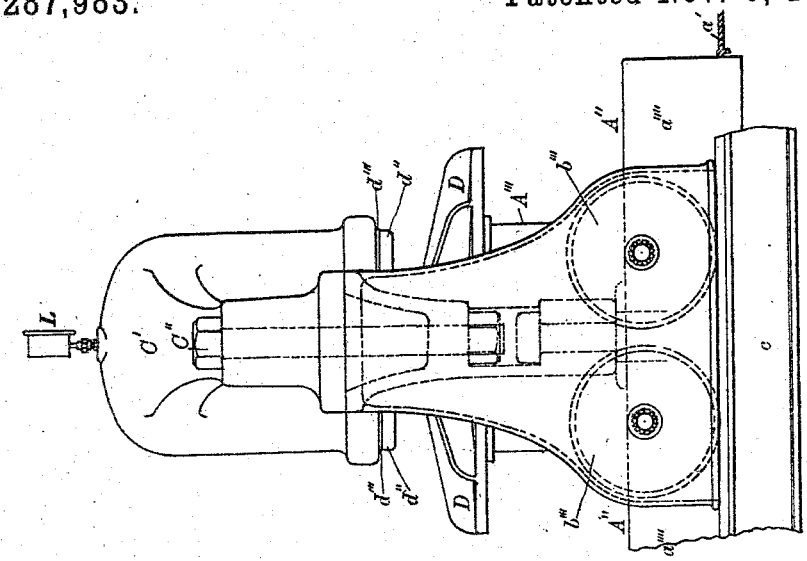
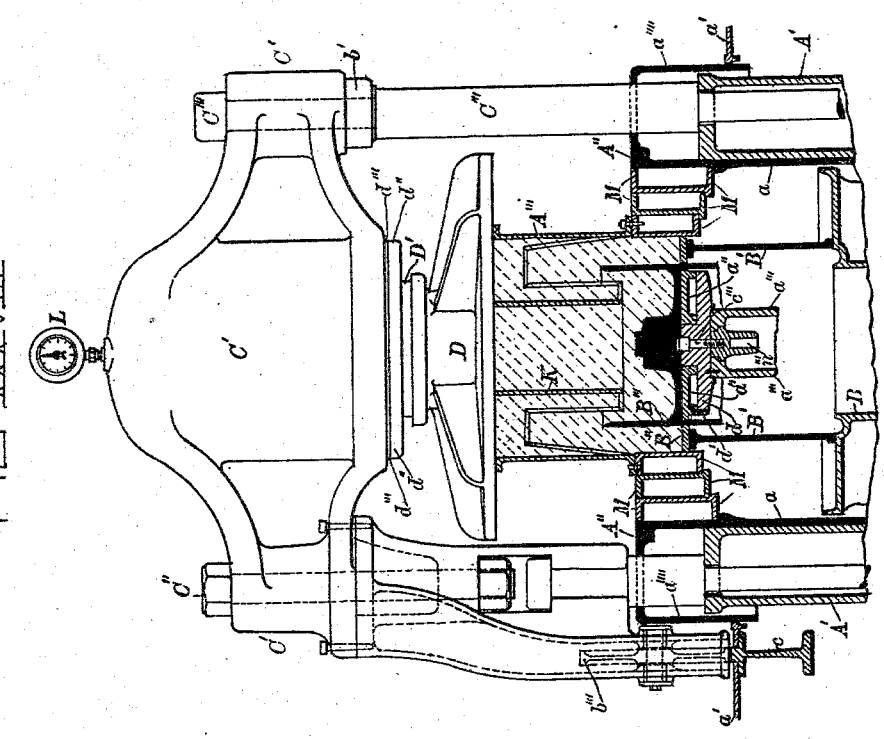

UNITED STATES PATENT OFFICE.

JOHN WALKER, OF INDIANAPOLIS, INDIANA.

MOLDING-MACHINE.

SPECIFICATION forming part of Letters Patent No. 287,983, dated November 6, 1883.

Application filed February 1, 1882. Renewed April 12, 1883. (No model.)

*To all whom it may concern:*

Be it known that I, JOHN WALKER, of Indianapolis, in the county of Marion and State of Indiana, have invented certain Improvements in Molding Machinery, of which the following is a specification.

The machine to which my improvements relate consists, briefly stated, as follows: A suitable bed or foundation piece for the machine, situated in a pit in the floor of the foundry, is provided with columnar bars, projecting upward, which sustain a hydrostatic cylinder. One of the columnar bars may be used as a pivot, around which the hydrostatic cylinder is moved to expose the portion of the machine upon which the flask is to be placed. To sustain the cylinder during this circular movement, and to prevent injurious strains being placed on the pivotal column, the said cylinder is fitted with truck-wheels, which rest on a circular track. The said cylinder is also provided with a system of pipes and valves, whereby water, oil, glycerine, or other suitable liquid under pressure can be admitted to the said cylinder, to effect a vertical movement of a ram or piston contained therein. To the lower end of the ram is attached a perforated platen, which, in the compression of sand, a part of the molding operation, is forced in contact with the flask containing the pattern. The flask is supported by a yielding plate which rests on a series of small hydrostatic rams, and the pattern, by a stationary plate which, at the beginning of the compressing operation, is below the surface of the yielding flask-supporting plate aforesaid. The difference in height between these two plates regulates the degree of compression of sand, as in all cases in the downward movement of the flask the said plates are brought to the same plane, and the sand which occupied the offset-space is driven into the flask. The pattern of the rim of the pulley is separate from that of the arms and hub, and rests on mechanism which will admit of its being withdrawn from the compressed mold before the flask is elevated to its original position by means of the smaller rams, which become operative in this direction as the pressure on the main ram and the platen is removed. The cylinder, with its ram and platen, is now moved from over the machine, the flask removed, and another one substituted therefor, and the operation, as above briefly described, repeated. The molds produced from a given pattern, being all exactly alike, and the flasks matched, any two of them may be united with the necessary cores to form a complete mold.

In the further description of said invention, which follows, reference is made to the accompanying drawings, forming a part hereof, and in which—

Figure I is a sectional elevation of the machine. Fig. II is a partly sectional elevation of the machine as seen from a different point. Fig. III is a plan of the invention. Fig. IV to XXXIV, inclusive, are details of the invention, all of which, excepting Figs. IX, XXXIII, and XXXIV, are on an enlarged scale. Figs. XXXV, XXXVI, and XXXVII illustrate the molding of a car-wheel, instead of a pulley. Figs. XXXVIII and XXXIX are details of parts of the machine, showing certain modifications in its construction.

Similar letters of reference indicate similar parts in all the views.

A is the base or foundation piece of the machine, situated in a pit in the floor of the foundry.

A' is a cylindrical case, which is accurately bored and bolted to the upper surface of the base A. The case A' projects upward to a point above the floor-line, which, in Figs. I and II of the drawings, is indicated by $z\ z$.

A'' is an annular plate, upon which the flask A''' is seated, and it has an inner peripheral downward projection, $a$, which is turned so as to fit closely within the cylinder-case A'. The plate A'' has also an exterior rim, $a''''$, which extends downward and conceals the upper edge of the cylindrical case A', thereby forming a joint with a rim or floor-plate, $a'$, which prevents the admission of sand to the pit in which the machine is located. An enlarged view of a part of this plate is shown in Fig. XXIV of the drawings. The upper surface of the plate A'' has holes which correspond with others in the flask to be placed on the plate, and the said parts are united by means of dowel-pins, of any suitable description. The devices for effecting a vertical movement of the plate A″ will be described hereinafter.

B is the central stand of the machine, situated within the case A′, and resting upon the foundation A. The stand sustains a removable ring, B′, which in turn supports the annular plate B″, against which a part of the bed of sand in the flask A‴ comes in contact, as will hereinafter appear.

A pattern-plate, a″, is supported centrally of the machine and within the removable annular plate B″ by means of a column, a‴. This pattern-plate consists of a hub-piece, which is attached, as hereinafter described, to the column a‴, and one or more removable extension-rings or annular addition-plates, which rest on a circumferential projection of the said hub-piece, as shown in Figs. I, IX, and XXXVIII of the drawings. The pattern-plate a″ may be made in a single piece, if such construction is preferred.

B‴ is the rim-pattern, which extends upward between the removable annular plate B″ and the pattern-plate a″, and it is secured to the flange b of a sleeve, C, which has, preferably, a tapered adjustable bush, adapted to slide vertically on the column a‴, as hereinafter explained. This flanged sleeve is shown in Figs. I, II, IV, V and VI, and in the last three views on an enlarged scale.

The rim-pattern B‴ is removable, as patterns of various sizes have to be used, and it will be understood that a change in the diameter of rim-patterns will necessarily entail a change in size of the removable annular plate B″, which surrounds it, and the annular removable extension pattern-plate a″.

C′ is a hydrostatic cylinder supported by columnar bars C″ and C‴, which are properly secured to the foundation A. The columnar bar C‴ is adapted as a pivot, around which the cylinder C′ may be turned, and in order that this movement of the cylinder may be accomplished easily and without injury to any part of the machine, an anti-friction bearing, b′, with conical rollers b″, is provided on the columnar bar C‴, and the said cylinder with truck-wheels having cylindrical anti-friction rollers b‴, which rest on a circular track, c. The anti-friction bearing, with its conical rollers, is shown on an enlarged scale in Figs. VII and VIII, and the truck-wheels are represented in Figs. I, II, and III. One end of the circular track c is sustained by the columnar bar C″, which is provided for the purpose with a clamp, c′, (shown in Figs. I, II and III,) and at the center or the other end by a third columnar bar, c″. (Shown in Figs. II and III.) In some cases it may be necessary to provide additional supports for the track c; or the track may extend to a wall of the building in which one end is secured, as shown in Fig. III.

It will be understood that the object of the pivotal movement of the cylinder C′ is to admit of the placing of flasks in the machine and their removal after the molding operation is completed.

By reference to Fig. III it will be seen that the cylinder C′, with an attachment thereof, hereinafter described, is represented by dotted lines in a removed position. By reference to Fig. III it will also be seen that the part of the cylinder sustained by the columnar bar C″ is hooked, to admit of the pivotal motion of cylinder before described. The pattern-plate a″ is fitted over a central projection of the column a‴, hereinbefore alluded to, and to increase the support the said column is provided with a flange, d, carrying a dowel-pin, d′, which enters a hole in the said plate. The flange d is secured to the column by means of a bolt, c‴.

D is the platen or device which is brought into contact with the upper edge of the flask A‴ and the upper surface of the sand in the same in the compressing operation, and it is secured to the lower end of the ram D′, which is adapted to slide in the cylinder C′. A ball or spherical joint is formed at the junction of the ram and platen, in order that the latter device may adjust itself to any deviation from a horizontal plane of the upper edge of the flask. The ram D′ is packed at its lower end by means of a gland, d″, and a packing-cup, d‴, of leather or other suitable material, and at its upper end by means of a plate, e, a follower, e′, and the leather cups e″.

The ram D′ is made somewhat smaller in diameter than the interior of the cylinder C′, as will be seen by reference to Fig 1. By this means an annular space is formed around the ram, which is utilized in the elevation of the ram and platen, as will be hereinafter explained.

The mechanism whereby water, oil, glycerine, or other liquid body is conducted to and from the cylinder C′ above the ram, and to and from the annular space around the ram, and otherwise controlled so as to effect the proper movement of the various parts of the machine in the compressing or ramming operation, consists as follows: A main feed-pipe, D″, connects the pump and accumulator (not shown in the drawings) with the upper end of the pivotal columnar bar C‴, which has channels e‴ therein, and a secondary feed-pipe, D‴, connects the said channels with the upper end of the cylinder C′ in such manner as to admit of the movement of the said cylinder and its connections from over the machine, as before referred to. In other words, a packed pivotal joint is effected where the secondary feed-pipe D‴ communicates with the channels e‴ and the main feed-pipe D″, as shown on enlarged scale in Figs. XXII and XXIII. E is the upper valve-case, located in the secondary feed-pipe D‴, containing a piston-valve, E′, the movement of which, by means of a handle, hereinafter described, causes the liquid under pressure to pass to and from the cylinder C′. Water, oil, or other liquid is conducted to the annular space around the ram D', before referred to, and which is designated by E'', by means of a branch feed-pipe, E''', extending from a second valve-case, F, corresponding very nearly in construction to the one E, and which is provided with a piston-valve, F', attached to or forming a part of the one E' in the case E.

In the further consideration of the feed-pipes and their attachments which follows reference should be made to Figs. XXII, XXIII, XXIX, XXX, XXXI, and XXXII of the drawings, which represent the said parts on an enlarged scale. Figs. XXII and XXIII show the head of the columnar bar C''', together with parts of the main and secondary feed-pipes D'' and D''', the former extending toward the pressure-accumulator and the latter in the direction of the hydrostatic cylinder. Fig. XXIX is a sectional view of the valve-cases and their attachments; Fig. XXX, a sectional view of a part of the same as seen from a different point; and Figs. XXXI and XXXII exterior views of the same, the last named being a plan.

The valve-cases E and F are each fitted with a cap, $f$, which is perforated, to prevent compression of air between the piston-valve and the cap as the piston is moved toward it.

The plunger-valves E' and F', which are properly packed at the inner ends of the valve-cases, are connected by a stem, $f'$, which is centrally slotted, and provided with a pin, $f''$, to which the end of a hand-lever, $f'''$, is attached. The hand-lever is pivoted to a frame, $g$, projecting from the valve-cases E and F, and it has a spring-handle, whereby it may be locked in any one of three positions indicated by dotted lines in Figs. XXIX, and numbered 1, 2, and 3. The upper valve-case, E, has feed-nozzles $g'$ and $g''$, to which the two sections of the feed-pipe D''' are connected, and the nozzle $g'$ is connected to the lower valve-case F by means of a pipe, $g'''$. The lower valve-case is also fitted with a nozzle, $h$, to which the pipe E''', leading to the annular space E'' around the hydrostatic ram, is attached.

The pipes D''', $g''$, and E''', instead of communicating directly with the interior of the valve-cases, terminate in annular grooves $h'$, corresponding in width with the diameter of the pipes, in order that the plunger-valve may be balanced by an equilibrium of pressure.

The plunger-valve E' has a slot, $h''$, which, when brought in connection with the annular grooves $h'$, establishes connection between the two sections of the supplemental feed-pipe D''' and admits liquid, under pressure, to the hydrostatic cylinder C' and above the ram D' therein. The plunger-valve F' has also a slot, $i$, similar to the one $h''$ in the valve E', adapted to connect the pipe $g'''$ with the pipe E''', leading to the annular space around the hydrostatic ram. The distance between the slots $h''$ and $i$ is such that water cannot be admitted to both the hydrostatic cylinder C' and the annular space E'' at the same time.

By reference to Figs. XXIX and XXX it will be seen that the plunger-valves E' and F' are hollow, and the central apertures, which are denoted, respectively, by $i'$ and $i''$, have branches which, in the valve E', are designated by $k$ and $k'$, and in the one, F', by $k''$ and $k'''$. The various lateral openings in the valves bear such relation to each other and to the annular grooves and the discharge-apertures $l\ l'$ that, when the water is being admitted to the cylinder through the slot $h''$, the discharge from the annular space around the ram is open, and vice versa. Both discharge-apertures $l$ and $l'$ communicate with a common outlet-pipe, $l''$, shown in Figs. XXXI and XXXII. When the hand-lever $f'''$ is in the first position shown in Fig. XXIX, water from the accumulator passes to the cylinder C', and the contents of the annular space around the ram are discharged. By moving the hand-lever to the second or neutral position all movement of water ceases, and by placing the hand-lever in the third position water is discharged from the cylinder and admitted to the annular space around the ram.

The plate A'', upon which the flask A''' rests, is elevated by means of four pistons or plungers F'', adapted to slide in cylinders F''', which, under certain circumstances, are supplied with water under pressure. These cylinders are united by supply-pipes G, connected to the valve-chamber G'. The piston F'', the cylinder F''', and a part of the pipe G are shown on an enlarged scale in Figs. XXIV and a part of the last named in XXV, and the valve-chamber G', with some of its connections, in Figs. XXVI, XXVII, and XXVIII.

Referring specially to Figs XXVI, XXVII, and XXVIII, it will be seen that the pipes G connect with annular grooves $m$ in the inner surface of the cylinder, which admit liquid to the entire circumference of the piston or plunger valve G'', and balances it in a similar manner to the valves E' and F' in the chambers E and F. This valve G'' has a slot, $m'$, whereby the two sections of the pipe G, connected to the case G', may be placed in communication to admit water from the accumulator to the small ram-chambers, and a central aperture, $m''$, having lateral openings $m'''$, whereby water may be discharged from under the small rams to the discharge-pipe $n$. The plunger-valve G'' extends upward through a guide-shell, G''', and is attached to a lever, H, pivoted to a part of the guide-shell. The lever H is formed into a handle at its outer end, and it has a thumb-bolt, whereby it may be secured to a graduated stand, H', bolted to the annular rim $a''''$ of the plate A''. A collar, $n'$, on the portion of the plunger-valve G'' within the guide-shell G''' (see Fig. XXVI) is to prevent the plunger-valve G'' being lifted higher than what is necessary to give a full passage for water from the small rams.

The devices to elevate and depress the rim-pattern B''', which is secured to the flange $b$ of the sleeve C, are represented in Figs. I, II, III, IV, V, VI, X, XI, XII, XIII, XIV, XV, and XVI, and consist as follows:

A screw, $n''$, with its upper end resting in a bearing, $n'''$, in the column $a'''$, and its lower end on a step, $o$, is provided with a threaded nut, $o'$, confined between two blocks, $o''$, fastened in the sleeve C by means of screws $o'''$. The screw $n''$ is revoluble, by means of the miter-gears $p$, from a horizontal shaft, $p'$, susceptible of revolution through the agency of miter gears $p''$, threaded spindle $p'''$, beveled gears $q\ q'$, counter-shaft $q''$, and hand-wheel $q'''$. By means of the hand-wheel $q'''$ a rapid movement of the rim-pattern may be effected, and small rim-patterns withdrawn from the sand; but where larger pulleys with wide faces are to be molded the hand-wheel H'' is used. This hand-wheel is secured to a short vertical shaft, $r$, which passes through an eccentric sleeve, $r'$, confined in a bracket, $r''$, which projects from the column $r'''$, supporting the spindle $p'''$. The short vertical shaft $r$ carries a pinion, $s$, which, by the circumferential movement of the eccentric sleeve $r'$, by means of a spring-handle, $s'$, is thrown either in or out of gear with the spur-wheel $s''$. The circular upper end of the bracket $r''$ has two holes in its outer surface, into either of which the inner end of the spring-handle $s'$ will pass. When the handle is in one hole the pinion $s$ is in gear with the spur-wheel $s''$, and when in the other the two gears are separated, the eccentricity of the sleeve $r'$ being sufficient to produce that result.

Of course it will be understood that when the hand-wheel $q'''$ is employed the gears $s$ and $s''$ must be separated.

An index-nut, $s'''$, on the threaded part of the vertical spindle $p'''$ is used to indicate the position of the rim-pattern, and in order to obtain a common movement of the index-nut and the rim-pattern the two threads are preferably made with the same pitch. The index-nut extends to the outer surface of the column $r'''$ through a slot therein, and the said column is fitted with an adjustable stop, $t$, so that after the withdrawal of the rim-pattern it can be accurately replaced for a subsequent molding operation.

To facilitate the adjustment of the rim-pattern the sleeve C is counterbalanced by means of a weight, H''', suspended from the outer end of a bifurcated lever, $t'$, which is connected to the sleeve C by means of links $t''$.

Parts of the invention not yet alluded to will be described and their uses fully set forth in the description of the operation of molding by means of the machine which follows:

Supposing a number of pulleys of the same size are to be molded, the first step is to elevate the platen and ram to the desired height by admitting water under pressure to the annular space around the ram, which operation is accomplished by moving the handle $f''''$ to position 3, Fig. XXIX. The handle may then be changed to the neutral position No. 2, when further elevation of the ram and piston is prevented. The hydrostatic cylinder with the elevated ram and platen is then moved from over the machine, or to the place indicated by its dotted delineation, Fig. III. The pattern of the hub and arms and the rim-pattern are then selected and placed in position, the rim-pattern with its upper edge projecting above the pattern-plate to a distance equal to one-half the face of the pulley to be made. The next step is to place the flask in position and arrange the degree of compression to which the mold is to be subjected. It will be understood that the degree of compression is regulated entirely by the height of the flask-supporting plate A'' above the pattern-plate B'' at the beginning of the compressing operation. In other words, the compression of mold is effected by adding to the filled flask the body of sand resting on the pattern and below the flask at the commencement of the molding operation. The vertical position of the flask-supporting plate A'' is effected by the height of the small rams that sustain it; and by reference to Figs. XXIV, XXVI, XXVII, and XXVIII it will be seen that the upward projection of the rams, when the same are under pressure, is governed by the relative positions of the slot in the plunger-valve G'' and the annular grooves in the valve-case or cylinder G' in communication with the pipes leading to and from the small ram-cylinders. Now, as the vertical adjustment of the said plunger-valve is received from the plate A'' through the medium of the telescopic lever H, (see Fig. XXVI,) it must be evident that when in the elevation of the said plate the lower end of the slot $m'$ passes above the upper edge of the lower annular groove, $m$, flow of water to underneath the small rams is suspended, and all motion stopped; but as the movement of the plunger-valve G'' is governed by that of the plate A'', it is obvious that any change in the relative positions of the handle H and the plate A'' must alter the height to which the plunger-valve G'' rises before all movement of water to small rams ceases. Now, it is to admit of this change, and to show at a glance the height to which the plate A'' may be moved, that the graduated stand H', before briefly alluded to, is coupled with the handle H and adjustably connected to it. The degree of compression being determined on and the handle H set, no further attention to this detail of the operation is necessary, as no matter what position the plate A'' is made to assume by direct application of force thereto the said plate, when released from such force, is automatically brought again to the prearranged location. The space below the flask and the flask are next filled with sand, the platen moved over the flask, and the handle $f''''$ changed to position No. 1, Fig. XXIX, when the annular space E'' around the ram D' is discharged of its contents, and water, under pressure from the accumulator, admitted to above the ram. The platen is thus brought in contact with the flask, and the flask and plate A″ forced down until the latter reaches the top of the cylindrical case A′ and the lower face of the flask is brought on the same plane as the upper face of the pattern-plate. During this operation all the sand originally below the flask is driven into the same, and the rim-pattern and pattern of the hub and arms of the pulley forced wholly within the compressed sand, and the mold completed to the step where it is necessary to withdraw the patterns.

It will be understood that in the downward motion of the flask-supporting plate A″ the water contained in the small ram-chambers F‴ below the rams F″ is forced back toward its source of supply, the accumulator, the transverse area of the ram D′ being much greater than that of the four small rams combined. The next step is to draw the rim-pattern, and this operation is performed through the agency of the hand-wheel H″ and the mechanism, before described, connecting it with the sleeve C, on the flange $b$ of which the rim-pattern is seated. The handle $f'''$ is next moved to its original position—viz., that indicated by the dotted line No. 3, Fig. XXIX—which effects the discharge of water from the head of the ram D′ and causes the pressure to be applied to the annular space E″ around the same. As the platen is raised from the flask the said flask is again elevated with the plate A″, the latter being moved by the small rams F‴, which, as before stated, automatically assume their original positions when released from the preponderating pressure of the ram D′. The mold is thus elevated from the pattern of the arms and hub of the pulley. After the hydrostatic cylinder, with its ram and platen, is again carried from over the flask, the latter is removed from its position on the flask-supporting plate A″, and another flask placed in position. The molding operation as described is then repeated.

It will be understood that in nearly all molding operations the compressed sand in the flask has to be vented, as the sand is too compact to allow of the escape of air, gases, and moisture without channels being formed. This venting is generally performed by means of a wire. To allow of the escape of air from the sand during its compression, the platen D and the sides of flask A‴ are perforated, and I insert in the sand, before its compression, the perforated pipes and dishes I (shown in the mold in Fig. I) and on an enlarged scale in XVII, XVIII, XIX, XX, and XXI. These perforated devices will of course be changed in size, shape, and other characteristics to suit the different patterns. I therefore do not confine myself to the designs shown.

The long conical pipes are intended to be placed between the partitions K in the flask, while the shallow dish is placed over the hub of the pattern, as shown in Fig. I, and they are preferably removed from the sand after the molding operation is completed and used in the next flask.

From the foregoing description it will be understood that after the machine is properly adjusted the only parts thereof to be operated by the person in charge to complete a mold is the handle $f'''$, which governs the flow of the compressing liquid to and from the hydrostatic cylinder above the ram and the annular space around the same, the hand-wheel H″, whereby the rim-pattern is withdrawn, and the hydrostatic cylinder and its attachments in the movement necessary to admit of the removal of the completed mold. A gage, L, on the upper end of the hydrostatic cylinder indicates at all times the pressure per square inch to which the ram is subjected.

Figs. IX and XXXVIII illustrate two methods of reducing the internal diameter of the plate A″ by inserting therein supplemental rings M to support the flask. As the rings M have to be of a considerable depth, in order to allow of the vertical adjustment of the plate A″, I make them of box form, or hollow, and the first one rests on a lip on the inner peripheral downward projection, $a$, of the plate A″, and when a series is used each inner ring rests on a lip on the adjoining outer one, as will be seen by reference to Fig. XXXVIII. In all cases it is desirable to have the internal diameter of the plate A″, or the operative supplemental ring M, slightly less than that of the flask for which it is adapted, in order that the compressing-sand may enter freely.

Fig. XXXIII is a top view of the yielding plate A″, the annular plate B″, and pattern-plates, with the pattern of the hub and arms of pulley, and Fig. XXXIV is a cross-section of one of the arms of the pattern and a part of the pattern-plate. Fig. XXXV is a sectional view of a completed mold for a car-wheel, showing the cores and chill. Figs. XXXVI and XXXVII illustrate the manner of molding a car-wheel by means of my invention, and shows that in this description of work the pattern may rest directly on the central stand, B, the ring B′ being removed—an operation that will be readily understood by those practically conversant with iron founding. Figs. XXXVIII and XXXIX are views, the former in section, of the upper portion of the machine, showing the truck-wheels, which sustain the hydrostatic cylinder when moved from over the center of the machine, resting on a rail about on a line with the floor-plate $a'$, the said truck-wheels being secured to a bracket extending from the under side of the said cylinder. They also show a series of supplemental rings, M, placed within the plates A″, to reduce its internal diameter to suit small pulleys.

The upper surface of the rim or floor plate $a'$ is preferably corrugated or otherwise roughened, as shown in Fig. III.

I do not limit myself to any particular kind of pump or apparatus for accumulating or storing the liquid under pressure; but it is designed to have a tank to supply the pump, and all liquid discharged from the various cylinders should, for the sake of economy, return to the tank, to be again used.

While the machine has been described as one for molding pulleys, I do not confine myself to this class of work, as car-wheels, reaper-wheels, and gearing from a pattern can be readily molded. Nor do I limit the machine to circular work, as shaft-hangers, and, in fact, all kinds of work, can be molded equally as well as pulleys.

In machines for general molding several of the parts thereof, which in the present machine are circular in form, may be rectangular or of some other shape.

I make no claim of invention herein to any improvements in the hydrostatic cylinder or the mechanism attached thereto, whereby movement of the ram or piston contained in the cylinder is effected, as I propose to embody such improvements in a separate application for Letters Patent.

I claim as my invention—

1. In a molding-machine, a stationary or fixed pattern-plate combined with an exterior flask-supporting plate sustained by means of hydrostatic rams, and means for operating the said rams, whereby the height of the flask-supporting plate may be adjusted with reference to that of the pattern-plate, substantially as and for the purpose specified.

2. In a molding-machine, a fixed or stationary pattern-plate, a flask placed over the said pattern-plate and seated on a yielding supporting-plate which surrounds the said pattern-plate, and a compressing device located above the said flask and adapted to be forced in contact with its upper surface, and thereby lower the said flask and its support in the compressing operation, substantially as specified.

3. In a molding-machine, a yieldingly-supported flask, a compressing device located over and above the said flask, and mechanism operating the said compressing device to force the flask in a downward direction in the molding operation, substantially as specified.

4. In a molding-machine, the combination of a yieldingly-supported flask, a hydrostatic compressing device situated over and above the said flask, and mechanism operating the said hydrostatic compressing device, whereby a portion thereof is made to bear upon the said flask in the compressing operation, and to be retracted after the said operation is completed, substantially as specified.

5. In a molding-machine, the combination of a plate for holding a pattern, an exterior flask-supporting plate sustained by independent resilient yielding devices, a flask, and retractible means for forcing the said flask and its support toward the pattern-holding plate, substantially as specified.

6. In a molding-machine, a supporting-plate for the flask sustained by yielding resilient devices, combined with a compressing-platen, and means for reciprocating the platen, substantially as and for the purpose specified.

7. In a molding-machine, a stationary or fixed plate for sustaining the pattern of the arms and hub of a pulley or wheel, a fixed plate for sustaining the sand exterior of the said pattern, the said plates being separated by an annular slot, combined with a rim-pattern adapted to pass through the said annular slot, a flask, a support for the said flask, and resilient sustaining devices for the said flask-support, substantially as and for the purpose specified.

8. In a molding-machine, a foundation or base-piece, a case seated on the base-piece, a flask-supporting plate guided by the said case, a fixed central column to sustain a pattern-plate, resilient yielding supports for the said flask-supporting plate, a flask, and a compressing-platen to force against the flask and its supports, substantially as specified.

9. In a molding-machine, compressing devices, which consist of a hydrostatic cylinder, a ram adapted to slide within the said cylinder, and a platen attached to the said ram, combined with a flask and a flask-support, with resilient compressible sustaining devices, substantially as specified.

10. In a molding-machine, a hydrostatic cylinder having therein a reciprocating ram, and a platen secured to the said ram, the whole being pivoted to the frame of the said machine, and its traveling end supported by means of truck-wheels and a track, substantially as specified.

11. In a molding-machine, a yieldingly-supported flask, combined with a compressing-platen adapted to rest on the face of the said flask, the said platen having perforations therein to allow of the escape of air from the sand in the compressing operation, substantially as specified.

12. The pattern-plate $a''$, supported by a column having a flange extending beyond the same, the said extension or flange exterior of the said column having means to effect the proper and regular relative positions of the said flange and plate, substantially as specified.

13. As means for effecting the automatic reciprocation of the flask-supporting plate $A''$, the combination of the series of small pistons $F''$ and pipes leading to the cylinders $F'''$ of the said pistons, the valve-case $G'$, and plunger-valve $G''$, the said valve being connected to the said plate $A''$ by means of the lever $H$ and the graduated stand $H'$, substantially as specified.

14. In combination with a flask and a compressing-platen, one or more removable perforated pipes or dishes to facilitate the escape of air from the sand in the compressing operation, substantially as specified.

15. As means for effecting a change of speed in the movement of the rim-pattern, the combination of the vertically-movable sleeve C with the shaft $p'''$, and mechanism connecting the same to the said sleeve, the gears $q$ and $q'$ and $s$ and $s''$ and hand-wheels $H''$ and $q'''$, the spindle of the pinion S being confined in an eccentric sleeve, whereby the said pinion can be thrown in or out of gear with the spur-wheel $s'$, substantially as specified.

16. As means for ascertaining and registering the vertical position of the rim-pattern, the combination of the sleeve C with the threaded spindles $p'''$ and $n''$, connected by means of gears to the intermediate shaft, $p'$, the spindle $n''$ having a nut united by suitable devices to the said sleeve, and the spindle $p'''$ being provided with a nut and an indicating device, substantially as specified.

17. The plate $A''$, having the peripheral downward projection $a''''$, combined with the rim or floor plate $a'$, whereby sand from the floor of the foundry is prevented from entering the pit, substantially as specified.

18. In combination with a vertically-adjustable annular flask-supporting plate having an inner peripheral downward projection, whereby it is guided in its vertical movement, a series of hollow or box-shaped addition-rings adapted to be secured therein, substantially as and for the purpose specified.

JOHN WALKER.

Witnesses:
GEORGE W. HARDESTY,
HUGH J. DRUMMOND.